(12) United States Patent
Wang et al.

(10) Patent No.: US 10,102,928 B2
(45) Date of Patent: Oct. 16, 2018

(54) METHOD FOR IMPROVING RESISTANCE OF FUSION REACTOR INNER WALL TO PLASMA IRRADIATION BY USING LAMINATION STRUCTURE

(71) Applicant: Beijing University of Technology, Chao Yang District, Beijing (CN)

(72) Inventors: Bo Wang, Beijing (CN); Dezhi Hu, Beijing (CN); Dong Ma, Beijing (CN); Guanghong Lu, Beijing (CN)

(73) Assignee: Beijing University of Technology, Beijing (CN)

( * ) Notice: Subject to any disclaimer, the term of this patent is extended or adjusted under 35 U.S.C. 154(b) by 125 days.

(21) Appl. No.: 15/122,761

(22) PCT Filed: Jan. 19, 2015

(86) PCT No.: PCT/CN2015/071020
§ 371 (c)(1),
(2) Date: Aug. 31, 2016

(87) PCT Pub. No.: WO2015/143940
PCT Pub. Date: Oct. 1, 2015

(65) Prior Publication Data
US 2017/0076824 A1    Mar. 16, 2017

(30) Foreign Application Priority Data
Mar. 26, 2014   (CN) .......................... 2014 1 0117811

(51) Int. Cl.
*G21B 1/13*     (2006.01)

(52) U.S. Cl.
CPC .......... *G21B 1/13* (2013.01); *G21Y 2002/101* (2013.01); *G21Y 2002/102* (2013.01); *Y02E 30/128* (2013.01)

(58) Field of Classification Search
CPC ....................................................... G21B 1/13
(Continued)

(56) References Cited

U.S. PATENT DOCUMENTS 5,126,102 A * 6/1992 Takahashi ............... G21B 1/13
428/550
5,975,410 A * 11/1999 Slattery .................... G21B 1/13
228/175

(Continued)

FOREIGN PATENT DOCUMENTS

CA    2462491 A1    10/2004
CN    103886919 A    6/2014
(Continued)

OTHER PUBLICATIONS

International Search Report for International Application No. PCT/CN2015/071020 dated Apr. 7, 2015, 3 pages.
(Continued)

*Primary Examiner* — Jack W Keith
*Assistant Examiner* — Daniel Wasil
(74) *Attorney, Agent, or Firm* — TraskBritt

(57) ABSTRACT

A method for improving resistance of a fusion reactor inner wall to plasma irradiation by using lamination structure comprises: making a material for facing plasma into multiple metal sheets, laminating the multiple metal sheets together according to a direction perpendicular to a wall surface, and combining the laminated multiple metal sheets with a copper substrate. The method relates to the field of nuclear applications, and is applicable to a plasma-facing surface on an inner wall of an apparatus for conducting a fusion reaction by using hydrogen isotopes. Not only does the method reduce aggregation of hydrogen, helium, and isotopes thereof, and the like, under a surface layer of a tungsten-based material, greatly reducing a blistering phe-
(Continued)

nomenon on a surface thereof, but also reduces thermal fatigue cracking damages.

10 Claims, 1 Drawing Sheet

(58) Field of Classification Search
USPC .................................................. 376/150, 288
See application file for complete search history.

(56) References Cited

U.S. PATENT DOCUMENTS

| | | | | |
|---|---|---|---|---|
| 5,988,488 | A * | 11/1999 | Slattery | G21B 1/13 228/194 |
| 6,565,988 | B1 | 5/2003 | Plochl et al. | |
| 2004/0195296 | A1 * | 10/2004 | Schedler | G21B 1/13 428/665 |
| 2007/0246517 | A1 * | 10/2007 | Schedler | G21B 1/13 428/665 |
| 2008/0032530 | A1 * | 2/2008 | Friedrich | G21B 1/13 439/145 |
| 2008/0100991 | A1 * | 5/2008 | Schedler | G21B 1/13 361/600 |

FOREIGN PATENT DOCUMENTS

| | | |
|---|---|---|
| EP | 0630875 A1 | 12/1994 |
| JP | 2011122883 A | 6/2011 |

OTHER PUBLICATIONS

International Written Opinion for International Application No. PCT/CN2015/071020 dated Apr. 7, 2015, 3 pages.
Chinese Office Action from Chinese Application No. 201410117811, dated Nov. 10, 2015, 8 pages.
Roth et al., "Hydrogen in tungsten as plasma-facing material," Phys. Scr. T145 (2011) 014031, 10 pages.

* cited by examiner

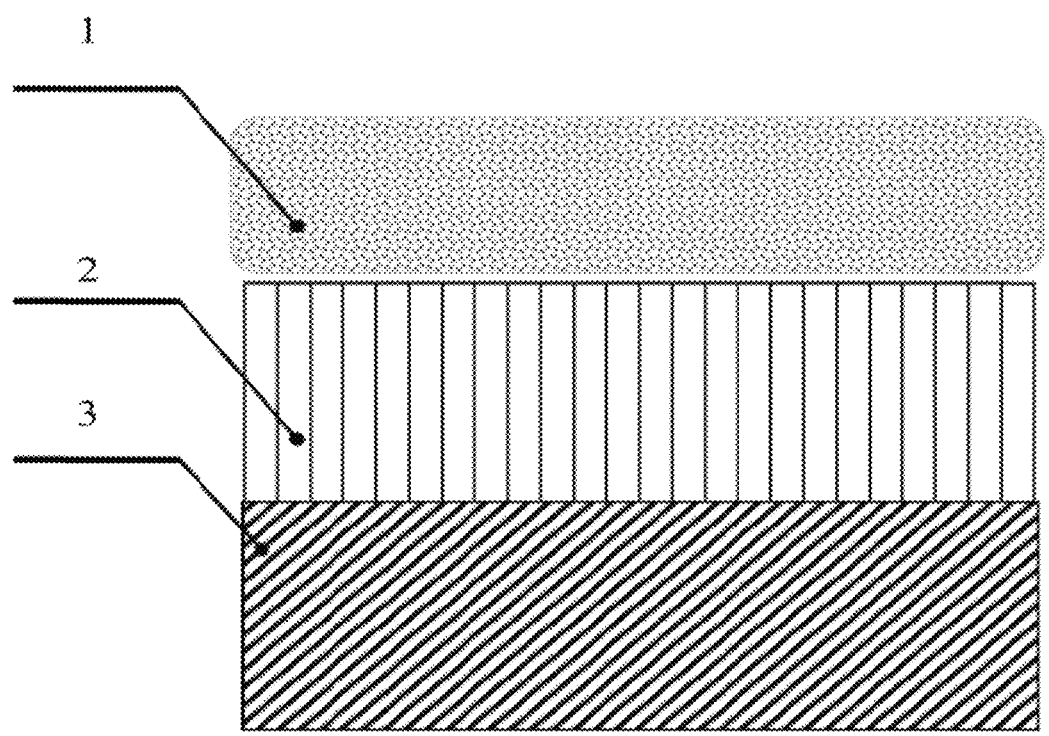

METHOD FOR IMPROVING RESISTANCE OF FUSION REACTOR INNER WALL TO PLASMA IRRADIATION BY USING LAMINATION STRUCTURE

CROSS-REFERENCE TO RELATED APPLICATIONS

This application is a national phase entry under 35 U.S.C. § 371 of International Patent Application PCT/CN2015/071020, filed Jan. 19, 2015, designating the United States of America and published as International Patent Publication WO 2015/143940 A1 on Oct. 1, 2015, which claims the benefit under Article 8 of the Patent Cooperation Treaty to Chinese Patent Application Serial No. 201410117811.X, filed Mar. 26, 2014.

TECHNICAL FIELD

The present disclosure relates to the field of nuclear energy applications, and relates to a method for improving resistance of a fusion reactor inner wall to plasma irradiation by using a laminated structure. The present disclosure is applicable to a plasma-facing surface on an inner wall of an apparatus for conducting a fusion reaction by using hydrogen isotopes.

BACKGROUND

Nuclear fusion energy is abundant and safe with a good application prospect, and thus might become the main energy source for human beings.

In a nuclear fusion apparatus, a plasma-facing material surface on the inner wall (hereinafter referred to as a "wall surface") will be subjected to some ordeals, such as high thermal shock, high doses of neutron irradiation, deuterium and helium plasma irradiation, and the like. Refractory metals such as tungsten, molybdenum, and the like, are commonly used as plasma-facing materials, and tungsten is now a widely accepted and preferred plasma-facing material. However, when tungsten, molybdenum, and the like are irradiated by deuterium or helium plasma for a long period of time, hydrogen, helium, and isotopes thereof will aggregate under their surface layer, leading to a surface-blistering phenomenon. Moreover, during the operation of a nuclear fusion apparatus, there exists a continuous temperature fluctuation, which produces a thermal fatigue effect on the wall surface, i.e., thermal fatigue cracks on the surface. These phenomena may damage the wall surface, affect service conditions of the wall surface material and thus shorten the life of the wall material. Hence, it is an important researching subject in the field of nuclear fusion material to improve the resistance of a wall surface material to the fusion plasma irradiation.

Previously, in order to inhibit surface blistering, some methods were proposed that can achieve this object in question by using a gradient-porous structure or a columnar crystal. However, none of them can effectively reduce thermal fatigue cracking damage and the preparation processes used for these methods are relatively complicated.

BRIEF SUMMARY

The present disclosure is focused on providing a method for improving resistance of a wall surface material to plasma irradiation by using a laminated structure. Not only can the method effectively reduce aggregation of hydrogen, helium, and isotopes thereof, and the like, beneath a tungsten-based material surface layer, greatly reducing the blistering phenomenon on a surface thereof, but the method can also reduce thermal fatigue cracking damage.

A structure for improving resistance of a fusion reactor inner wall to plasma irradiation is characterized in that multiple metal sheets are placed between the plasma and a copper substrate, wherein the multiple metal sheets are laminated in a direction perpendicular to a wall surface, and then combined with the copper substrate.

In contrast to the blocky structure of the fusion reactor inner wall in the prior art, the fusion reactor inner wall component according to the present disclosure has an improved laminated structure that not only avoids the blistering phenomenon on the inner wall surface caused by the aggregation of hydrogen, helium, and isotopes thereof, and the like, and reduces thermal fatigue cracking damage, but also significantly increases the irradiation dose.

Further, each metal sheet has a thickness between 1 μm and 1 mm. When the metal sheet has a preferable thickness between 1 μm and 20 μm, the irradiation dose of the laminated structure may be significantly increased.

Further, the material of the metal sheets is a plasma-facing material, preferably tungsten, tungsten alloy, molybdenum or molybdenum alloy.

Further, the gaps between the metal sheets are in a range from 0.01 μm to 1 μm, preferably from 0.5 μm to 1 μm.

The thickness of the plasma-facing material composed of the laminated metal sheets may be equivalent to that of the blocky plasma-facing material in the conventional fusion devices.

The present disclosure further provides a method for manufacturing the abovementioned structure for improving resistance of a fusion reactor inner wall to the plasma irradiation, comprising: making the plasma-facing material into multiple metal sheets, laminating the multiple metal sheets together in a direction perpendicular to the wall surface, and combining the laminated multiple metal sheets with the copper substrate.

Further, the method for combining the laminated metal sheets with the copper substrate may be casting or brazing.

The technical solution adopted by the present disclosure is to make a plasma-facing material into a large number of metal sheets, laminate each metal sheet together in a direction perpendicular to the wall surface, and combine the laminated metal sheets with a copper substrate through conventional processes such as casting, brazing, etc., and thereby forming a fusion reactor inner wall component facing plasma. The laminated structure is characterized in that: 1) the plasma-facing material is not made into blocks, but into sheets; 2) the sheets are pressed against each other, the plane of the sheets being in a direction perpendicular to the wall surface; 3) the sheets have a thickness between 1 μm and 1 mm, and when they are made of the same material, the thinner the sheets are, the better they are for improving resistance to damages caused by plasma irradiation; and 4) in the laminated structure according to the present disclosure, the metal sheets are laminated together conventionally and combined with the copper substrate using methods such as casting or brazing, which solves the crack problem that exists when the gradient-porous structure or the columnar crystal structure is subjected to irradiation. Moreover, it was found that when the gaps between the metal sheets are in a range from 0.01 μm to 1 μm, a larger irradiation dose may be endured without a blistering or cracking phenomenon.

In the laminated structure according to the present disclosure, there are a lot of gaps perpendicular to and communicated with the wall surface. Hydrogen and helium that enter into the wall material during plasma irradiation would get into these gaps through lateral diffusion and then rapidly diffuse to the wall surface and come back to the plasma via these gaps acting as channels, thereby avoiding the accumulation of hydrogen and helium in the wall material and inhibiting blistering. Meanwhile, since the wall surface is not restricted in a normal direction, thermal cycling stresses formed on the wall surface by continuous temperature fluctuations produced during the operation of a fusion apparatus are perpendicular to two-dimensional plane stresses in the normal direction. Moreover, after the blocky structure is replaced with the laminated structure, the gaps between individual laminated sheets, which are perpendicular to the wall surface, may effectively release the two-dimensional plane stresses and thus effectively reduce thermal fatigue cracking damage on the wall surface. Further, as the laminated sheets are perpendicular to the wall surface, there is no interface in the direction of heat diffusion and thus there is no significant effect on thermal conduction of a wall structure.

Although some methods have been proposed that are used to inhibit blistering by means of a gradient-porous structure or a columnar crystal, up to now, the method of the present disclosure has not been proposed for inhibiting the blistering of the wall material caused by plasma irradiation and reducing thermal fatigue cracking damage by using a laminated structure perpendicular to the wall surface.

The advantages of the present disclosure lie in that:
(1) each sheet of the laminated structure is perpendicular to the wall surface, can simultaneously inhibit blistering and reduce thermal fatigue cracking damage; and
(2) as compared with the "gradient-porous structure" and the "columnar crystal," the production process for the laminated structure is simpler and propitious to a batch production.

BRIEF DESCRIPTION OF THE DRAWING

FIG. 1 is a schematic cross-section of a plasma-facing surface on an inner wall using a laminated structure according to the disclosure, and illustrates a plasma, a laminated structure, and a copper substrate.

DETAILED DESCRIPTION

The laminated structure used by the present disclosure will be further described below with reference to the drawing and examples.

In conventional approaches blisters will form beneath the surface layer of the wall material after it is exposed to plasma irradiation of hydrogen isotopes and helium for a long period of time. This is because hydrogen isotopes and helium enter the surface layer of the plasma-facing material during plasma irradiation and aggregate into blisters. Meanwhile, thermal cycling stresses resulting from continuous temperature fluctuations lead to fatigue cracking damage. Aiming at solving both of two problems, the general integral blocky structure of the wall surface is replaced with the laminated structure in the present application, so as to reduce damage in both respects.

Provided in the present application is a method for improving resistance of a fusion reactor inner wall surface to plasma irradiation by using a laminated structure, wherein, the laminated structure is composed of a number of wall material sheets laminated together and the sheets are oriented in a direction perpendicular to the inner wall surface. The wall material refers to currently used inner wall plasma-facing materials based on various metals, which mainly are tungsten, tungsten alloy, molybdenum, molybdenum alloy, and the like. The sheets can be manufactured by known methods, such as the hot or cold rolling processes. The sheets are pressed against each other. The sheets, which may be made of the same wall material or of different wall materials, are laminated together. The wall material sheets that are laminated may be connected together with one of the end faces via methods such as casting or welding, thereby composing a plasma-facing surface structure component on the inner wall of the fusion apparatus. This disclosure will be further described by the following examples.

Example 1

The typical form of the laminated structures for the plasma-facing surface is shown in FIG. 1. A laminated structure 2, which contacts plasma 1, is composed of a number of tungsten sheets that are prepared by hot rolling of a tungsten material, with each of the sheets having a thickness of 0.2 mm. The sheets are oriented in a direction perpendicular to the inner wall surface and there is close contact between them. A copper substrate 3 is beneath the laminated structure, which is closely connected with the copper substrate 3 via conventional casting.

Irradiation tests were conducted by subjecting the plasma-facing surface of the laminated structure 2 to deuterium and helium plasma beams. When the irradiation dose is up to $5 \times 10^{25}$ m$^{-2}$, there is no blistering or thermal fatigue crack on the plasma-facing surface.

Example 2

The laminated structure 2 of Example 2 is the same as that of Example 1, with the exception that the sheets are molybdenum sheets that are prepared by cold rolling of a molybdenum material. Each of the sheets has a thickness of 1 μm and is oriented in a direction perpendicular to the surface. The copper substrate 3 is beneath the laminated structure composed of molybdenum sheets, which is combined with the copper substrate 3 via conventional brazing.

Irradiation tests were conducted by subjecting the plasma-facing surface of the laminated structure to the deuterium and helium plasma beams. When the irradiation dose is up to $4 \times 10^{25}$ m$^{-2}$, there is no blistering or thermal fatigue crack on the plasma-facing surface.

Example 3

The laminated structure of Example 3 is the same as that of Example 1, with the exception that the laminated structure of Example 3 is obtained by alternately laminating two types of sheets that are respectively prepared by hot rolling of niobium tungsten alloy and cerium tungsten alloy materials. The sheets are oriented in a direction perpendicular to the inner wall surface. The niobium tungsten alloy sheets have a thickness of 1 mm and the cerium tungsten alloy sheets have a thickness of 0.5 mm. The copper substrate is beneath the laminated structure composed of niobium tungsten alloy and cerium tungsten alloy sheets, which is combined with the copper substrate via conventional brazing.

Irradiation tests were conducted by subjecting the plasma-facing surface of the laminated structure to the deuterium and helium plasma beams. When the irradiation dose is up to $8 \times 10^{26}$ m$^{-2}$, there is no blistering or thermal fatigue crack on the plasma-facing surface.

Example 4

The laminated structure of Example 4 is the same as that of Example 1, with the exception that the laminated structure is obtained by alternately laminating two types of tungsten sheets with a thickness of 0.02 mm and 0.01 mm, respectively.

Irradiation tests were conducted by subjecting the plasma-facing surface of the laminated structure to the deuterium and helium plasma beams. When the irradiation dose is up to $1 \times 10^{27}$ m$^{-2}$, there is no blistering or thermal fatigue crack on the plasma-facing surface.

Example 5

The laminated structure of Example 5 is the same as that of Example 4, with the exception that the laminated structure is obtained by alternatively laminating two types of tungsten sheets with a thickness of 0.01 mm and 0.003 mm, respectively.

Irradiation tests were conducted by subjecting the plasma-facing surface of the laminated structure to the deuterium and helium plasma beams. When the irradiation dose is up to $5 \times 10^{27}$ m$^{-2}$, there is no blistering or thermal fatigue crack on the plasma-facing surface.

From Examples 4 and 5, it can be seen that when the plasma-facing surface of the laminated structure according to the present disclosure is used, in which each of the metal sheets has a thickness between 1 µm and 20 µm, the tolerable irradiation dose is significantly increased and there is no blistering or thermal fatigue crack on the plasma-facing surface.

Example 6

The laminated structure of Example 6 is the same as that of Example 1, with the exception that the gaps between the metal sheets are further limited to be 1.0 µm.

Irradiation tests were conducted by subjecting the plasma-facing surface of the laminated structure to the deuterium and helium plasma beams. When the irradiation dose reaches $5.5 \times 10^{27}$ m$^{-2}$, there is no blistering or thermal fatigue crack on the plasma-facing surface.

Example 7

The laminated structure of Example 7 is the same as that of Example 4, with the exception that the gaps between the metal sheets are further limited to be 0.1 µm.

Irradiation tests were conducted by subjecting the plasma-facing surface of the laminated structure to the deuterium and helium plasma beams. When the irradiation dose is up to $4.8 \times 10^{27}$ m$^{-2}$, there is no blistering or thermal fatigue crack on the plasma-facing surface.

Example 8

The laminated structure of Example 8 is the same as that of Example 5, with the exception that the gaps between the metal sheets are further limited to be 0.01 µm.

Irradiation tests were conducted by subjecting the plasma-facing surface of the laminated structure to the deuterium and helium plasma beams. When the irradiation dose reaches $4.5 \times 10^{27}$ m$^{-2}$, there is no blistering or thermal fatigue crack on the plasma-facing surface.

From the irradiation results of Examples 6-8, it can be seen that when the plasma-facing surface of the laminated structure according to the present disclosure is used, with the gap between the metal sheets being in a range from 0.01 µm to 1 µm, there is no blistering or thermal fatigue crack on the surface even if the irradiation dose is up to $4.5 \times 10^{27}$ m$^{-2}$.

Although the present disclosure has been described above in detail by using general descriptions and specific embodiments, amendments or improvements may be made based on the present disclosure, which is obvious to those skilled in the art. Thus, amendments or improvements that are made without departing from the spirit of this disclosure fall into the scope of the present disclosure.

The present disclosure provides a method for improving resistance of a fusion reactor inner wall to plasma irradiation by using a laminated structure, which is applicable to a plasma-facing surface on an inner wall of an apparatus for conducting a fusion reaction by using hydrogen isotopes. A plasma-facing material is made into multiple metal sheets. The multiple metal sheets are laminated together in a direction perpendicular to the wall surface, and then the laminated multiple metal sheets are combined with a copper substrate. The laminated structure according to the present disclosure may be applied to nuclear fusion devices in the field of nuclear energy, which not only effectively reduces aggregation of hydrogen, helium, and isotopes thereof, and the like, under a surface layer of a tungsten-based material, thus greatly reducing the blistering phenomenon on a surface thereof, but also reduces thermal fatigue cracking damage, bringing about considerable economic and social benefits.

What is claimed is:

1. A structure for improving resistance of an inner wall of a fusion reactor to plasma irradiation, comprising:
    a fusion reactor comprising an inner wall; and
    a structure for improving resistance of the inner wall of the fusion reactor to plasma irradiation, the structure comprising:
        a copper substrate; and
        a plurality of metal sheets combined with the copper substrate, wherein individual metal sheets of the plurality of metal sheets are laminated to one another, each metal sheet having a thickness between 1 µm and 20 µm, and gaps between adjacent metal sheets of the plurality of metal sheets being between 0.01 µm and 1 µm, wherein a plane of the plurality of metal sheets extends in a direction perpendicular to a plane of the inner wall of the fusion reactor.

2. The structure of claim 1, wherein each metal sheet of the plurality of metal sheets comprises a plasma-facing material.

3. The structure of claim 2, wherein the plasma-facing material comprises at least one of tungsten, tungsten alloy, molybdenum or molybdenum alloy.

4. The structure of claim 3, wherein each metal sheet of the plurality of metal sheets comprises the same plasma-facing material.

5. The structure of claim 3, wherein the plurality of metal sheets is manufactured by hot or cold rolling.

6. The structure of claim 3, wherein at least some of the metal sheets of the plurality of metal sheets comprises a different plasma-facing material than an adjacent metal sheet.

7. The structure of claim 1, further comprising channels located in the gaps between the adjacent metal sheets, wherein the channels are configured such that components of a plasma that enter the inner wall of the fusion reactor are diffused from each of the adjacent metal sheets and returned to the plasma through the channels.

8. A method for improving resistance of an inner wall of a fusion reactor to plasma irradiation, the method comprising:
- laminating a plurality of metal sheets together with gaps between adjacent metal sheets of the plurality of metal sheets being between 0.01 μm and 1 μm, each metal sheet of the plurality of metal sheets having a thickness between 1 μm and 20 μm and comprising a plasma-facing material;
- positioning the plurality of metal sheets proximate a surface of an inner wall of a fusion reactor with a plane of the plurality of metal sheets extending in a direction perpendicular to a plane of the inner wall of the fusion reactor; and
- combining the laminated plurality of metal sheets together with a copper substrate.

9. The method of claim 8, wherein the plurality of metal sheets and the copper substrate are combined together via casting or brazing.

10. The method of claim 8, further comprising forming channels in the gaps between the adjacent metal sheets such that components of a plasma that enter the inner wall of the fusion reactor are laterally diffused from opposing side surfaces of the adjacent metal sheets and returned to the plasma through openings of the channels located adjacent the plasma.

* * * * *